United States Patent [19]
Thompson

[11] Patent Number: 4,996,908
[45] Date of Patent: Mar. 5, 1991

[54] THROUGH HOLE ROTATING CYLINDER

[75] Inventor: Thomas F. Thompson, Logansport, Ind.

[73] Assignee: Logansport Machine Co., Inc., Logansport, Ind.

[21] Appl. No.: 278,041

[22] Filed: Nov. 30, 1988

[51] Int. Cl.$^5$ .............................. F01B 31/10
[52] U.S. Cl. .................... 92/106; 92/117 R; 279/4; 277/152; 277/156
[58] Field of Search ............ 92/106, 116, 117; 279/4; 277/152, 156; 415/110, 111, 112, 113

[56] References Cited

U.S. PATENT DOCUMENTS

| | | | |
|---|---|---|---|
| 3,417,672 | 12/1968 | Sampson | 384/397 |
| 4,040,338 | 8/1977 | Wilson et al. | 92/106 |
| 4,139,206 | 2/1979 | Knohl | 279/1 C |
| 4,168,654 | 9/1979 | Wilson et al. | 92/106 |

Primary Examiner—John T. Kwon
Assistant Examiner—Christopher Verdier
Attorney, Agent, or Firm—Mason, Kolehmainen, Rathburn & Wyss

[57] ABSTRACT

A through hole rotating cylinder for controlling a workpiece gripping chuck associated with a rotary machine tool. The cylinder includes a cylinder body assembly, piston tube and fluid distributor section rotatable within a housing and defining a central axial opening. Bearings supported between the housing and cylinder body assembly are lubricated by flow from a hydraulic system used to move the piston tube in the cylinder body assembly. A coolant collector receives coolant liquid travelling through the central axial opening. A seal assembly between the coolant collector and the bearings prevents coolant from contaminating the hydraulic fluid in the hydraulic system.

8 Claims, 2 Drawing Sheets

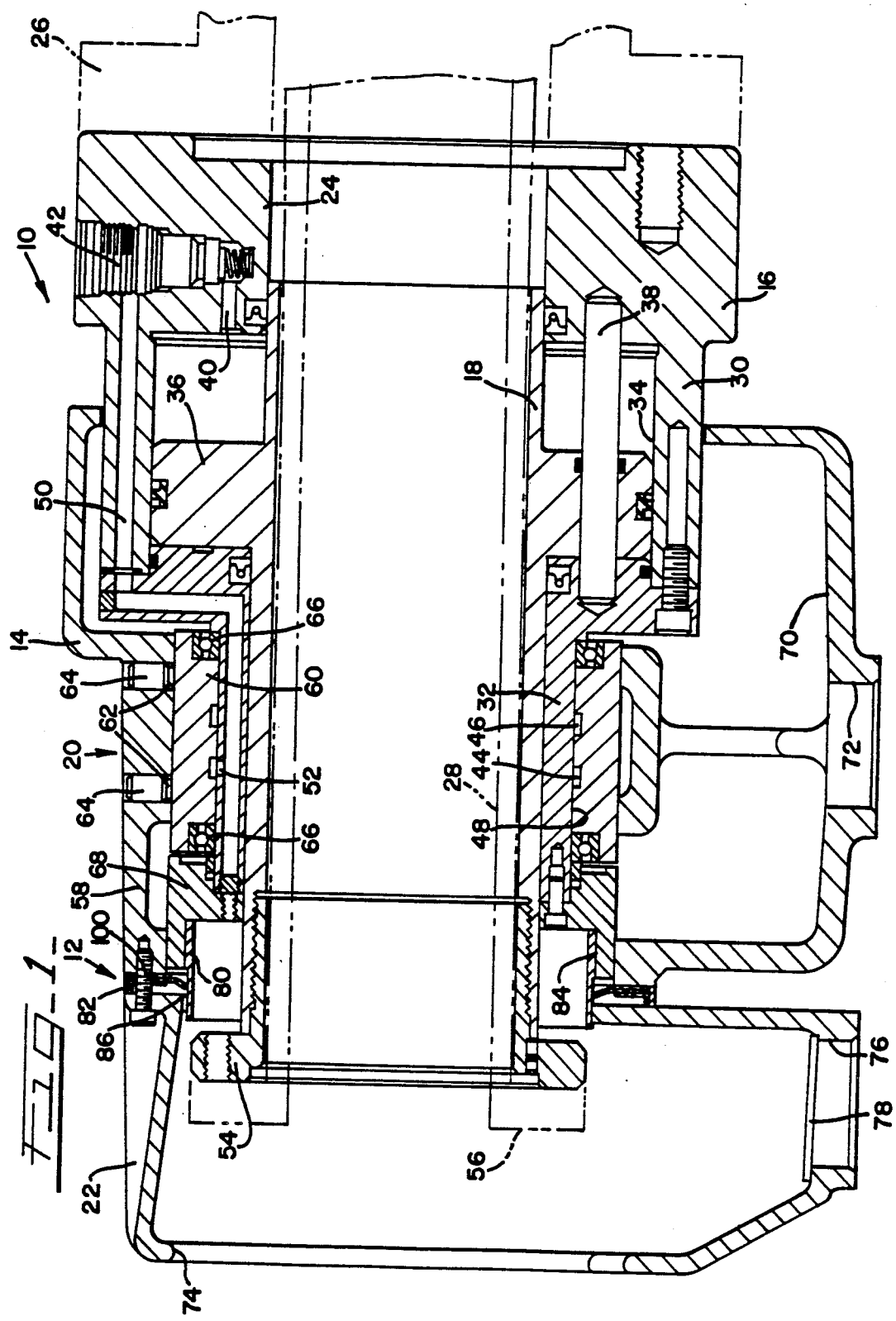

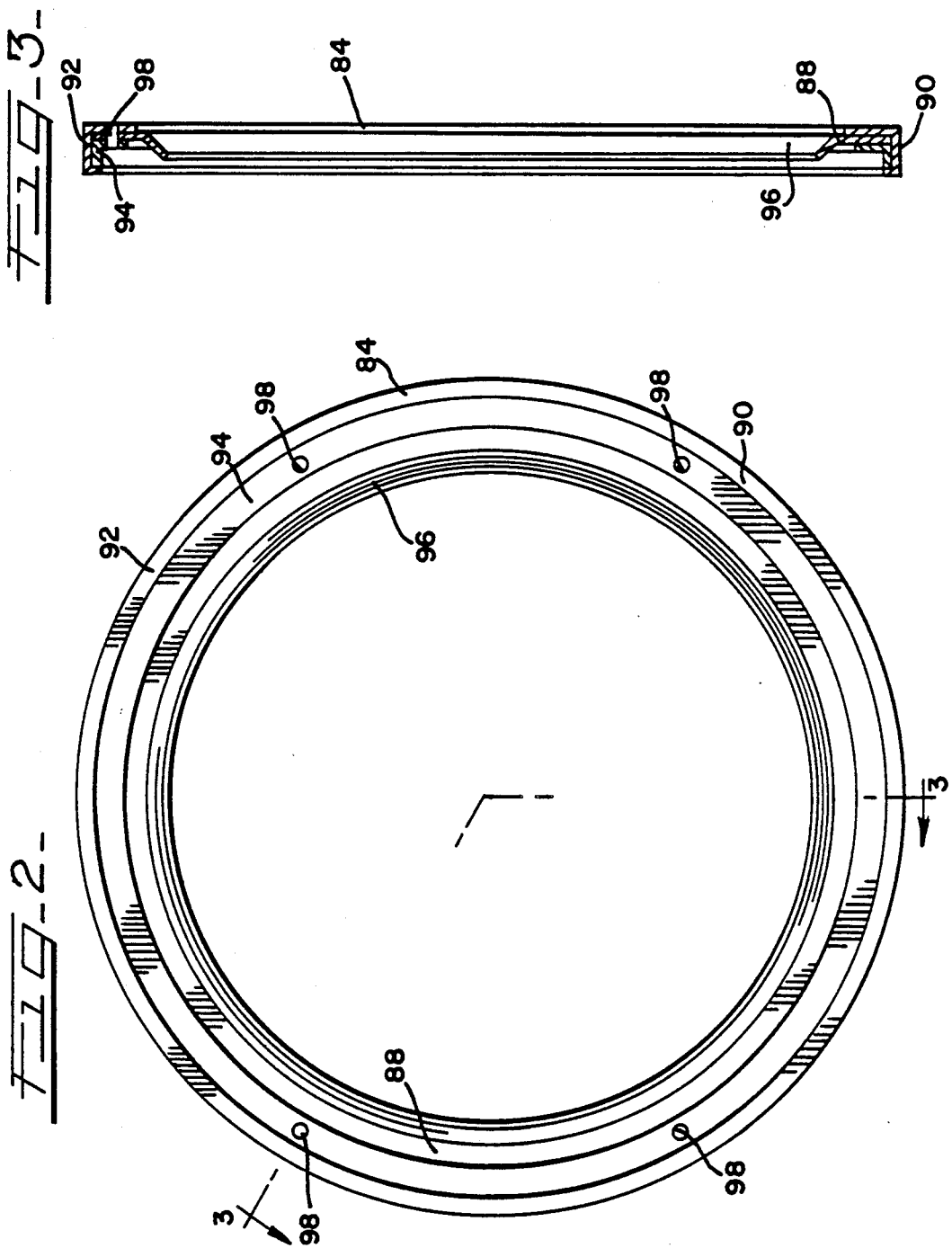

THROUGH HOLE ROTATING CYLINDER

FIELD OF THE INVENTION

The present invention relates to through hole rotating cylinders and more particularly to a solution to the problem of contamination by coolant of the hydraulic systems of through hole rotating cylinders.

DESCRIPTION OF THE PRIOR ART

Rotary machine tools such as lathes typically include a chuck or similar workholding device for holding a workpiece in position for engagement by a cutting tool. Jaws of the chuck are moved radially inward to grip the workpiece and radially outward to release the workpiece. A through hole rotating cylinder including a hydraulic cylinder and piston is employed to actuate the chuck for moving the jaws. The cylinder is part of a cylinder body assembly that includes passageways of a hydraulic system for selectively moving the piston for controlling the chuck by reciprocation of a draw tube connected between the piston and the chuck.

The workpiece together with the chuck, the piston and the cylinder body assembly are rotated during the workpiece forming operation. In modern manufacturing processes, high speed rotations of thousands of revolutions per minute are not uncommon. To permit rotation of the cylinder body assembly and associated elements, the cylinder body assembly is supported by bearings in a cylinder housing. Hydraulic fluid from the hydraulic system is used to lubricate the bearings as well as to actuate the piston.

Through hole cylinders and chucks are used for cylindrical or tubular workpiece stock so that end segments of the workpiece can be advanced to the cutting region. The workpiece stock is advanced along a central opening extending from the rear of the machine tool through the cylinder housing, the cylinder body assembly and the piston to the cutting region.

In order to prevent heat damage to the cutting tool, coolant liquid is applied to the region where the workpiece is engaged by the cutting tool. The coolant can travel rearwardly along and around the workpiece stock through the central opening to the through hole rotating cylinder. Known through hole rotating cylinders include coolant collectors for collecting coolant that reaches the through hole rotating cylinder and for preventing the coolant from being thrown radially outwardly around the work area.

A serious problem arises in known through hole cylinders because of the incompatibility of the coolant and the hydraulic fluid. A typical coolant is a water based liquid that can degrade the effectiveness of the typical oil based or oil like hydraulic fluid used in the rotating cylinder. Coolant traveling to the region of the rotating cylinder can enter the hydraulic system at the rotary interface near the bearings supporting the cylinder body assembly and contaminate the hydraulic fluid. Such contamination can result in failure of the bearings with consequent possibility of damage to the machine and the necessity for repair. There has been a long-standing need for a solution to this problem.

U.S. Pat. No. 4,040,338 discloses a fluid supply distributor used with a through hole cylinder and chuck with provisions for minimizing damage due to bearing failure, but does not disclose a way to positively prevent coolant from contaminating the hydraulic system. U.S. Pat. No. 3,417,672 discloses a different type of fluid distributor and rotating hydraulic cylinder. U.S. Pat. No. 4,139,206 discloses a high speed chuck of the type controlled by a through hole rotating cylinder.

SUMMARY OF THE INVENTION

A principal object of the present invention is to provide a through hole rotating cylinder that solves the problem of coolant contamination of the hydraulic fluid used for operating and lubricating the rotating cylinder.

In brief, the objects and advantages of the present invention are achieved by providing a through hole rotating cylinder assembly for actuating a draw tube or bar for a workpiece holding chuck or the like. The cylinder assembly includes a cylinder body assembly having a central axis and defining a cylinder surrounding the central axis and a piston tube having a workpiece receiving central axial opening aligned with the central axis and having a radially extending piston portion received in the cylinder for reciprocal movement in the axial direction. A hydraulic system includes fluid passageways in the cylinder body assembly for moving the piston in the cylinder. A housing surrounding at least part of the cylinder body assembly includes bearing for supporting the cylinder body assembly for rotation relative to the housing about the central axis. Passages of the hydraulic system supply fluid to the bearings. A coolant collector communicates with the workpiece receiving central axial opening of the piston tube. A seal assembly is disposed between the coolant collector and the bearings for isolating the coolant collector from the hydraulic system. The seal assembly includes a pair of cooperating seal elements supported respectively by the housing and by the cylinder body assembly. One of the seal elements is a rigid cylindrical surface coaxial with the central axis and the other seal element is a flexible seal disk extending at least partly in the radial direction and having a free periphery in surface contact with the rigid cylindrical surface.

BRIEF DESCRIPTION OF THE DRAWINGS

The present invention together with the above and other objects and advantages may best be understood from the following detailed description of the embodiment of the invention illustrated in the drawings, wherein:

FIG. 1 is a sectional view taken along the central axis of a through hole rotating cylinder constructed in accordance with the present invention;

FIG. 2 is a rear elevational view on an enlarged scale of a seal assembly of the through hole rotating cylinder of FIG. 1; and FIG. 3 is a sectional view of the seal assembly taken along the line 3—3 of FIG. 2.

DETAILED DESCRIPTION OF THE PREFERRED EMBODIMENT

Referring now to the drawings, in FIG. 1 there is illustrated a through hole rotating cylinder generally designated by the reference character 10 and constructed in accordance with the principles of the present invention. In accordance with an important feature of the invention, the through hole rotating cylinder 10 is provided with a seal assembly generally designated as 12 for preventing contamination by coolant of the hydraulic fluid used to operate and lubricate the through hole rotating cylinder 10.

In general, the through hole rotating cylinder 10 includes a fixed cylinder housing assembly 14, a rotatable cylinder body assembly 16, a piston tube 18 movable axially relative to the cylinder body assembly 16, a fluid distributor section 20 and a coolant collector 22. A central axial opening 24 extends from the rear to the front (from left to right as viewed in FIG. 1) of the through hole rotating cylinder 10 to permit elongated workpiece stock (not shown) to be advanced toward a through hole chuck and cutting region of a machine tool.

The front end of the cylinder body assembly 16 is attached to a spindle 26 of a machine tool. A draw tube or bar 28 attached to the piston tube 18 serves to operate a workpiece gripping chuck when the piston is reciprocated. Coolant travelling from the region where the workpiece is gripped and cut is received within the coolant collector 22. U.S. Pat. No. 4,040,338 and 4,139,206 incorporated here by reference may be consulted for disclosures of through hole rotating chucks and fluid distributors beyond that helpful to an understanding of the present invention.

Cylinder body assembly 16 includes a body 30 attached to a stem portion 32, and these elements define a cylinder 34 slideably receiving a radially extending piston portion 36 of the piston tube 18. The cylinder body assembly 16 rotates together with the machine spindle 26, and drive pins 38 cause the piston tube 18 to rotate while permitting reciprocal movement of the piston tube 18.

A hydraulic system for the through hole rotating cylinder 10 includes a passageway 40 extending between a lock check valve assembly 42 and one side of the piston portion 36. A second passageway not seen in FIG. 1 extends to the opposite side of the piston portion 36. Fluid ports in the housing 14 are alternately pressurized in a conventional manner to move the piston portion 36 in opposite directions. The ports are in communication through passageways not seen in FIG. 1 with a pair of annular passages 44 and 46 encircling a cylindrical valving surface 48 defined on the stem 32. A passage 50 extends from the annular passage 44 through a port 52 to the lock check valve assembly 42. A similar port and passage not seen in FIG. 1 interconnect annular passage 46 and the lock check valve assembly 42. U.S. Pat. No. 4,040,338 provides a more complete disclosure of a hydraulic system similar to that of the illustrated fluid distributor section 20.

The back end of the piston tube 18 is connected to a piston rod flange member 54. A flange 56 of the draw tube 28 is secured to the flange member 54. When the piston portion 36 is moved in alternate axial directions by the application of pressurized hydraulic fluid to a selected side of the cylinder 34, the draw tube is moved axially to operate a chuck to grip or to release a workpiece.

As disclosed in more detail in U.S. Pat. No. 4,040,338, the cylinder housing 14 includes a fixed outer housing portion 58 and an inner body 60 normally fixed to the outer housing by pressure elements 62 biased by screws 64 and by frangible sleeves disposed at the fluid supply ports. The inner body 60 carries a pair of bearings 66 permitting rotation of the stem portion 32 of the cylinder body assembly within the cylinder housing 14. The bearings are captured in place by a bearing retainer 68 attached to the stem portion 32. The bearings 66 are lubricated by controlled leakage of hydraulic fluid from the annular passages 44 and 46 across the cylindrical valving surface 48. Hydraulic fluid from the bearings 66 travels to a sump 70 having a return or drain port 72. In the event of a failure of the bearing or lubrication systems, seizure of the rotating elements results in the inner body breaking free from the outer housing portion 58, thereby to avoid extensive damage to other components of the through hole rotating cylinder 10.

During a machining operation, coolant travels within the draw tube 28 through the central axial opening 24 in the rearward direction. The coolant collector 22 surrounds the rear end of the central opening 24 and includes an axially aligned opening 74 permitting workpiece stock to be advanced through the through hole rotating cylinder 10. A drain port 76 provided with a filter screen 78 permits collection and reuse of coolant.

Coolant reaching the flange 56 of the draw tube 28 is thrown forcibly out into the coolant collector and is difficult to control and contain. Some of this coolant tends to splash and move axially in the forward direction toward the bearings 66. Serious problems result if coolant is permitted to flow around the bearing retainer and mix with the hydraulic fluid travelling from the bearings 66 toward the sump 70. Contamination of oil based hydraulic fluid with water based coolant can result in loss of lubrication capability and damage to the bearings 66 and other components.

Seal assembly 12 is provided in accordance with the present invention to positively prevent the introduction of coolant from the coolant collector into the through hole rotating cylinder 10. Assembly 12 includes a sleeve 80 and a seal unit 82. Sleeve 80 is press fit into a recess 84 formed in the bearing retainer 68 and provides a rotating cylindrical seal surface 86 surrounding and coaxial with the axis of the through hole rotating cylinder 10. Preferably the sleeve 80 is made of a hardened steel material having greater resistance to wear and abrasion than the other components of the through hole rotating cylinder 10.

Seal unit 84 cooperates with the sleeve 80 and is best shown in FIGS. 2 and 3. Unit 84 includes a flexible seal disk 88 made of a wear resistant seal material such as carbon filled polytetrafluoroethylene. The outer periphery of disk 88 is captured in a circular rim 90 formed of an outer J-shaped element 92 and an inner L-shaped element 94. Most of disk 88 is oriented in a radial plane, but the inner region 96 is inclined to provide a compliant seal against the seal surface 86. This inclined portion is sloped in the rearward direction when the seal unit is in place.

As seen in FIG. 1, the circular rim is clamped between the coolant collector 22 and the bearing retainer 68. Holes 98 in the rim 90 mate with screws 100 securing the coolant collector 22 to the outer housing portion 58 to fix the seal unit 82 in place. The free inner periphery or edge of the seal disk 88 is in sliding, sealing contact with the rotating cylindrical seal surface 86. The use of carbon filled polytetrafluoroethylene in combination with the hardened steel of sleeve 80 provides a reliable sealing effect having a long life, even at high rotational speeds of thousands of revolutions per minute.

While the invention has been described with reference to details of the illustrated embodiment, these details are not intended to limit the scope of the invention as defined in the appended claims.

I claim:

1. A through hole rotating cylinder assembly for actuating a draw bar for a workpiece holding means, said cylinder assembly comprising in combination:
   a cylinder body assembly having a central axis and defining a cylinder surrounding said central axis;
   a piston tube having a workpiece receiving central axial opening aligned with said central axis and having a radially extending piston portion received in said cylinder for reciprocal movement in the axial direction;
   means on said piston tube for interconnecting said piston tube with the draw bar;
   a hydraulic system including fluid passageway means defined in said cylinder body assembly for reciprocating said piston in said cylinder;
   a housing surrounding at least part of said cylinder body assembly;
   bearing means disposed between said housing and said cylinder body assembly for supporting said cylinder body assembly for rotation relative to said housing about said central axis;
   said passageway means including passage means for supplying fluid to said bearing means;
   coolant collector means communicating with said workpiece receiving central axial opening of said piston tube, and;
   a seal assembly disposed between said coolant collector means and said bearing means for isolating said coolant collector means from said hydraulic system;
   said seal assembly including a pair of cooperating seal elements supported respectively by said housing and by said cylinder body assembly;
   the first of said seal elements comprising a rigid cylindrical surface coaxial with said central axis and the second of said seal elements comprising a flexible seal disk extending at least partly in the radial direction and having a free periphery in surface contact with said rigid cylindrical surface.

2. A through hole rotating cylinder assembly as claimed in claim 1 wherein said draw bar extends through said central axial opening.

3. A through hole rotating cylinder assembly as claimed in claim 1 further comprising a cylindrical sleeve attached to said cylinder body assembly, said rigid cylindrical surface being defined on said sleeve.

4. A through hole rotating cylinder assembly as claimed in claim 3, said sleeve being formed of a hardened steel material.

5. A through hole rotating cylinder assembly as claimed in claim 3, said seal disk being captured in an outer circular rim, and said rim being attached to said housing.

6. A through hole rotating cylinder assembly as claimed in claim 3, said disk including an inclined inner region.

7. A through hole rotating cylinder assembly as claimed in claim 1, said disk being formed of polytetrafluoroethylene.

8. A through hole rotating cylinder assembly as claimed in claim 1, said disk being formed of carbon filled polytetrafluoroethylene.

* * * * *